United States Patent [19]

Close

[11] Patent Number: 4,457,069
[45] Date of Patent: Jul. 3, 1984

[54] SHARPENING DEVICE FOR A CHAIN SAW

[75] Inventor: Albert Close, Inglewood, Calif.

[73] Assignee: McCulloch Corporation, Los Angeles, Calif.

[21] Appl. No.: 459,349

[22] Filed: Jan. 20, 1983

[51] Int. Cl.³ .............................................. B23D 63/16
[52] U.S. Cl. ...................................... 30/138; 30/139; 76/25 A
[58] Field of Search ................. 30/138, 139; 76/25 A; 51/285

[56] References Cited

U.S. PATENT DOCUMENTS

| | | | |
|---|---|---|---|
| 3,260,287 | 7/1966 | Oehrli | 30/138 |
| 3,465,795 | 9/1969 | Tupper | 30/138 |
| 4,062,253 | 12/1977 | Dilworth | 30/139 X |

*Primary Examiner*—Frank T. Yost
*Attorney, Agent, or Firm*—Murray, Whisenhunt and Ferguson

[57] ABSTRACT

A sharpening device for a chain saw having an endless saw chain driven by a motor supported by a chain saw housing includes a housing adapted to be mounted to the chain saw housing spaced from the cutters. A grinding assembly having a grinding stone mounted thereon is movably mounted to the housing from a first position spaced from the cutters to a second position wherein the grinding stone is in contact with the cutters, and vice-versa. An actuator assembly is also movably mounted in the housing from a retracted position to an actuated position, and vice-versa. A coupling assembly is provided which moves the grinding assembly to the first position responsive to movement of the actuator assembly to the retracted position. A first spring is mounted between the actuator assembly and the grinding assembly and yieldably urges the actuator assembly toward the retracted position and the grinding assembly toward the second position. A second spring is mounted between the housing and actuator assembly and yieldably urges the actuator assembly toward the retracted position. Thus, when the actuator assembly is moved from the retracted position to the actuated position the grinding assembly is moved from the first position to the second position by means of the force applied by the first spring.

20 Claims, 10 Drawing Figures

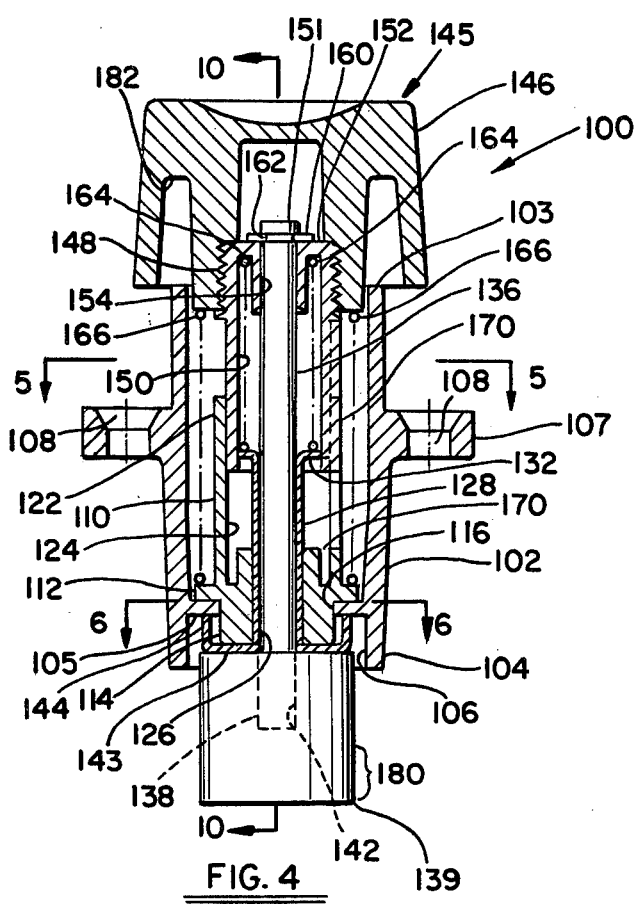
FIG. 4
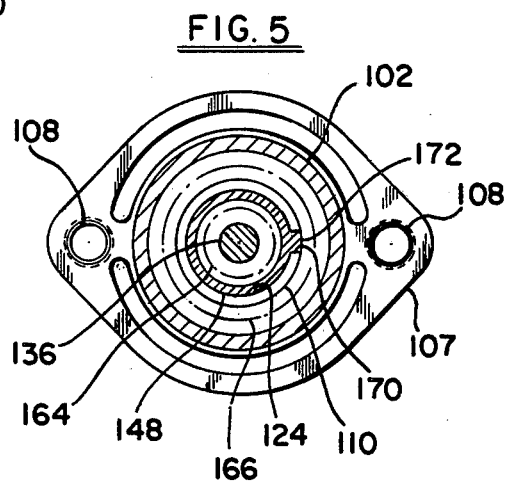
FIG. 5
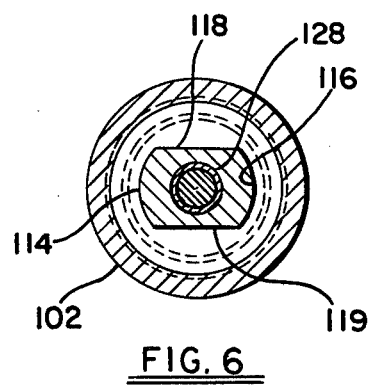
FIG. 6
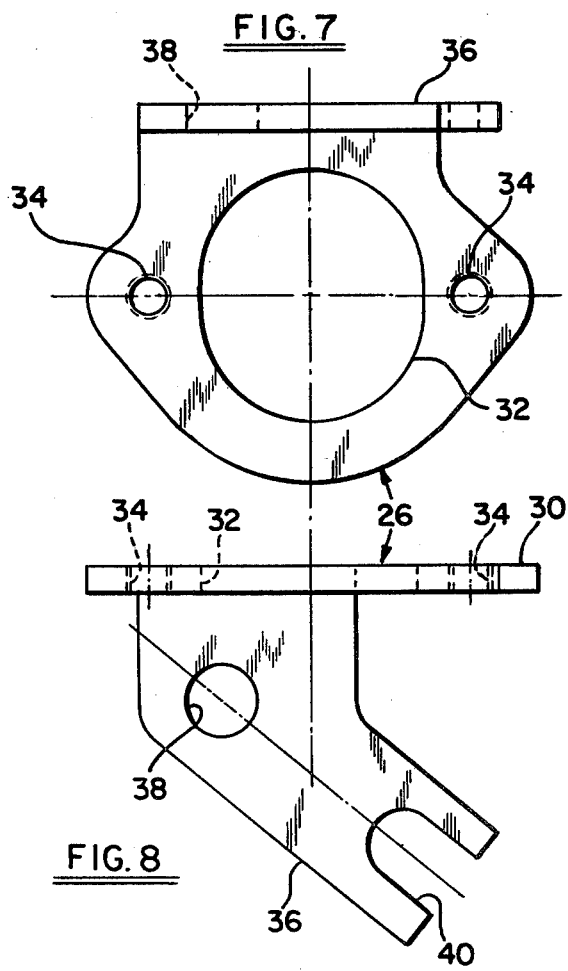
FIG. 7
FIG. 8

SHARPENING DEVICE FOR A CHAIN SAW

BACKGROUND OF THE INVENTION

1. Field of the Invention

The invention relates to the field of sharpening devices for chain saw cutters and particularly to a sharpening device that is mounted to the chain saw housing, and which when actuated will automatically sharpen the cutters when the cutters are in motion.

2. Description of Prior Art

There have been numerous designs for saw chain sharpeners mounted directly upon the chain saw to eliminate the tedious and time consuming hand filing of the chain cutters. Such chain saws use top sharpening chains of the type disclosed in U.S. Pat. No. 3,183,973, Chain Saw With Sharpening Means, by Muir.

A typical prior art sharpener is disclosed in U.S. Pat. No. 3,040,602, Saw Chain Sharpener And Method by R. R. Carlson. The Carlson sharpener includes a body pivotally mounted to the saw housing which contains an adjustable sharpening element mounted thereon. To sharpen the chain one need only rotate the body so that the sharpening element contacts the chain, preferably at a point where the cutters are traveling over the driving sprocket. While this design works it had several drawbacks. One of these is that the amount of force applied to the cutters is variable and thus there is always a possibility of over-sharpening and prematurely wearing the cutters. It is also subject to clogging due to debris becoming caught between the sharpening element and body.

Another example can be found in U.S. Pat. No. 3,495,795, Easily Dressed Sharpener by M. D. Tupper. In the Tupper design a carrier housing is movably mounted on the saw housing. A bushing is slideably mounted in the carrier. Rotatably mounted in the bushing is a shaft having a grinding stone at one end. The stone is biased away from the bushing by means of a spring. The operator pushes a knob attached to the opposite end of the shaft causing the stone to engage the cutters. The biasing means provides a resilient contact with the cutters tending to limit the force applied. Wear is compensated for by means of a separate screw which moves the carrier toward the cutters. This design is relatively expensive to manufacture, is subject to clogging, and there is no real means to totally control the force applied. Furthermore the screw has no detent means so it is difficult to know how much advancement should be made in order to compensate for wear.

A design which eliminates the clogging problem and provides for accurate adjustment of stone feed to compensate for wear was developed by J. L. Dilworth and is disclosed in U.S. Pat. No. 4,062,253, Chain Saw Sharpener. The Dilworth design includes a stone movable from a retracted position to one in engagement with the cutters. A spring within the housing is used to bias the stone to the retracted position. An adjustment knob is provided on the opposite end which when rotated feeds the stone to compensate for wear. An internal detent is also provided which provides accurate feed control. The movement of the grinding stone is controlled by an adjustable stop. Thus having the mechanism within the housing eliminates the possibility of clogging, and the use of the detent provides accurate feed. But even here there is a possibility of over-adjusting the stone, which can result in premature wearing out of the stone and a reduction in the life of the cutters.

Other patents of interest are U.S. Pat. Nos. 3,147,644, Sharpening Means For Chain Saws by J. W. Oreilli; 3,596,689, Saw Chain And Sharpeners by J. W. Oreilli; and 3,301,098, Chain Saw Sharpening Wheel by J. W. Oreilli.

It is therefore a primary object of this invention to provide a chain saw sharpener which automatically compensates for grinding stone wear.

Another object of this invention is to provide a chain saw sharpener that is inexpensive to manufacture.

A further object of this invention is to provide a chain saw sharpener that does not require precise positioning in order to accomplish sharpening of the chain.

A still further object of this invention is to provide a chain saw sharpener that is relatively insensitive to the force applied by the operator, thus reducing the possibility of prematurely wearing out the chain.

SUMMARY OF THE INVENTION

The invention is a sharpening device for a chain saw of the type having an endless saw chain driven by power means supported by a chain saw housing. The sharpening device comprises a positioning means typically in the form of a sharpener housing mounted on the chain saw spaced from the cutting chain. A grinding means having a grinding stone mounted thereto is movably mounted to the sharpening housing. The grinding means is movable from a first position spaced from the cutting chain to a second position in contact with the cutting chain, and vice-versa. An actuator means is also mounted to the sharpener housing and is movable from a retracted position to an actuated position responsive to an applied force, such as operator finger pressure. First biasing means, typically in the form of a spring, is operatively connected to the actuator means and the grinding means, and yieldably urges the actuator means towards the retracted position and the grinding means towards the second position. Second biasing means, also typically in the form of a spring and operatively connected to the actuator means and the positioning means, yieldably urges the actuator means toward the retracted position.

The novel features which are believed to be characteristic of the invention, both as to its formularization and method of operation, together with further objects and advantages thereof, will be better understood from the following description, in connection with the accompanying drawings in which presently preferred embodiments of the invention are illustrated by way of examples. It is to be expressly understood, however, that the drawings are for purposes of illustration and description only and are not intended as a definition of the limits of the invention.

BRIEF DESCRIPTION OF THE DRAWINGS

Illustrated in
FIG. 1 is a partially broken away elevational view of a portion of a chain saw incorporating a sharpening device constructed and arranged in accordance with the present invention;
Illustrated in
FIG. 2 is an enlarged view of the sharpening device and its mounting arrangement illustrated in FIG. 1;
Illustrated in
FIG. 3 is a sectional view of the sharpening device taken along the line 3—3 of FIG. 2;

Illustrated in

FIG. 4 is a sectional view of a second embodiment of the sharpening device of the present invention;

Illustrated in

FIG. 5 is a sectional view of the sharpening device taken along the line 5—5 of FIG. 4;

Illustrated in

FIG. 6 is a sectional view of the sharpening device taken along the line 6—6 of FIG. 4;

Illustrated in

Figure 1:
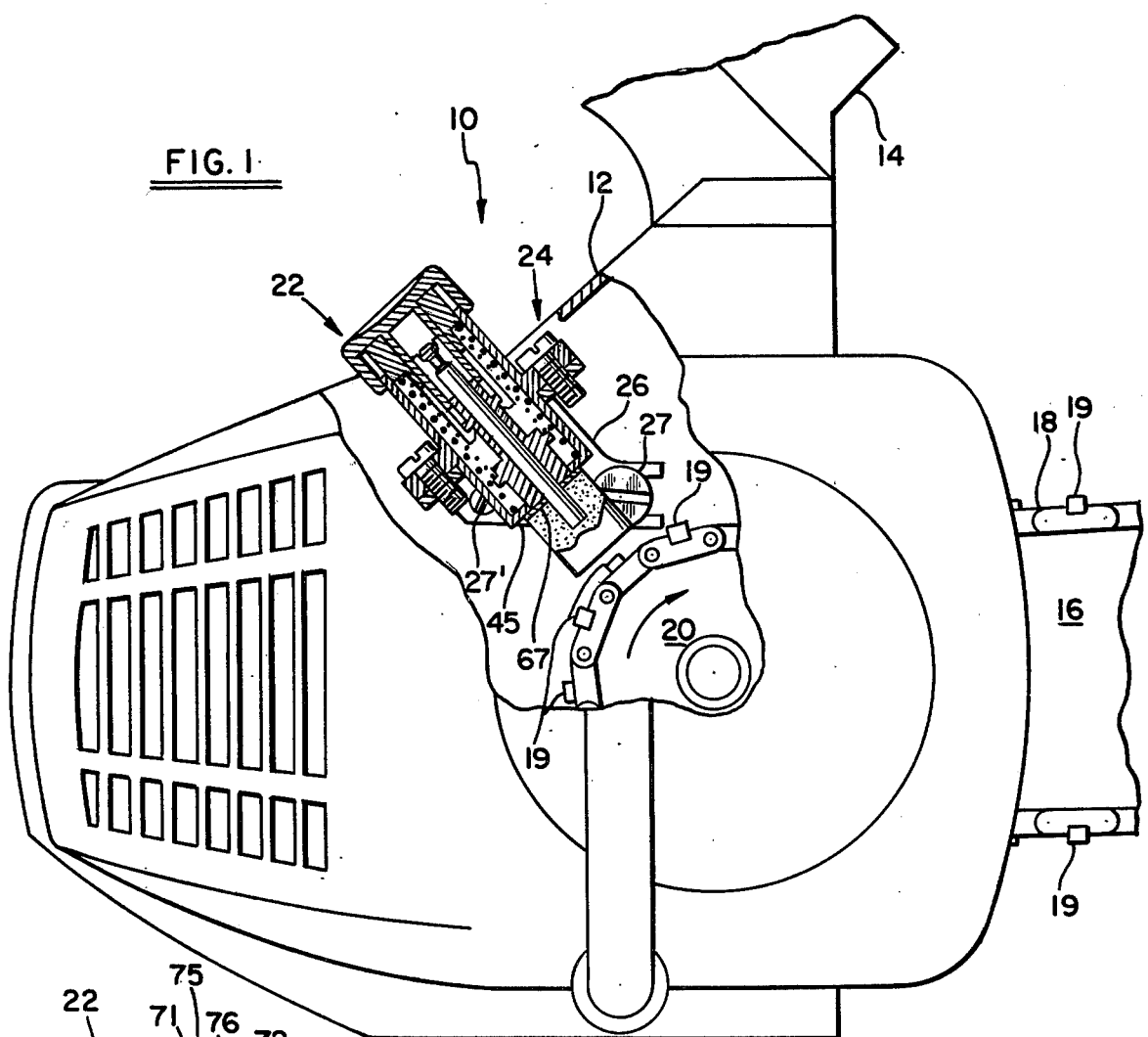

FIG. 7 is a top view of the mounting bracket for the sharpening device shown in FIG. 1;

Illustrated in

FIG. 8 is a side view of the mounting bracket shown in FIG. 7;

Illustrated in

Figure 2:
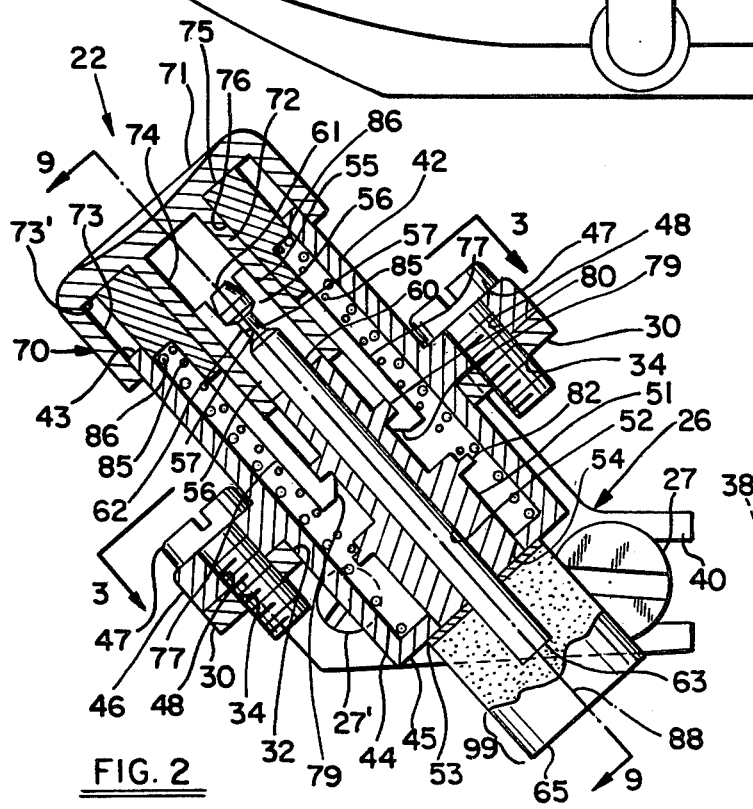
Figure 9:
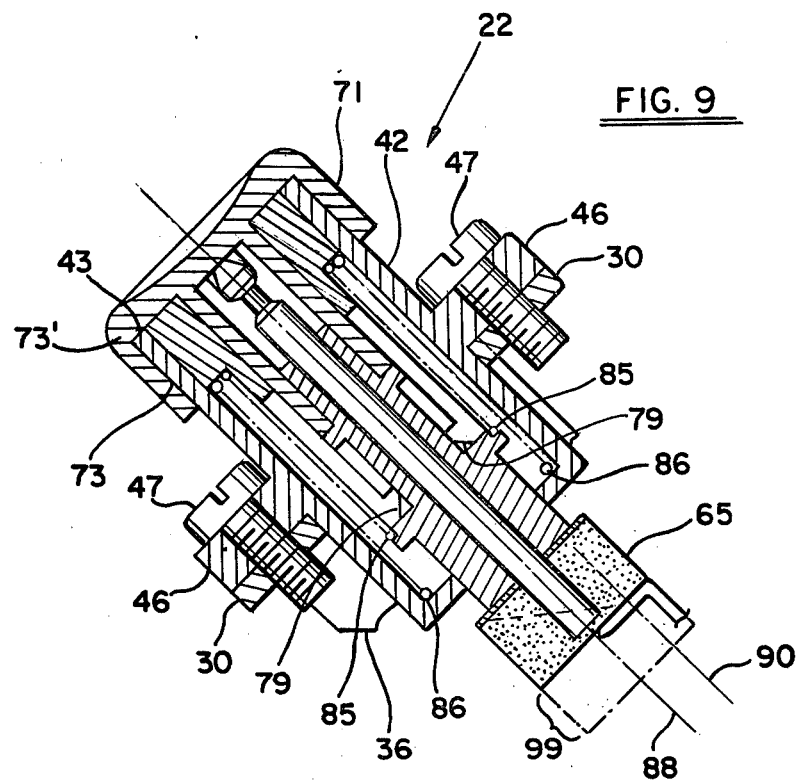
Figure 10:
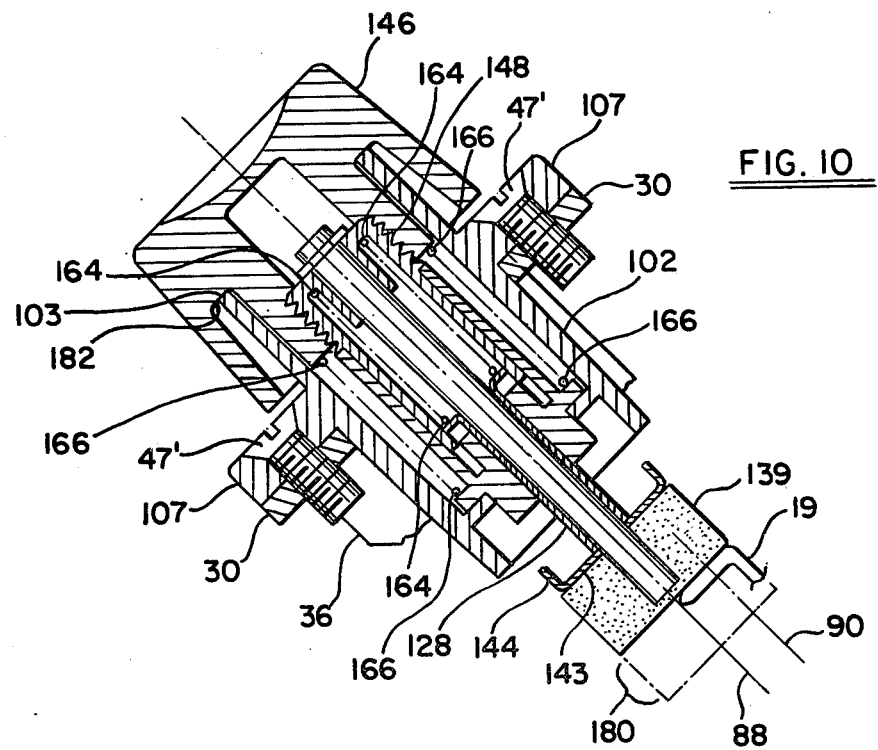

FIG. 9 is a sectional view of the sharpening device taken along the line 9—9 of FIG. 2 and shown in the actuated position with portions of the mounting bracket omitted for clarity; and Illustrated in FIG. 10 is a sectional view of the sharpening device taken along the line 10—10 of FIG. 4, and shown in the actuated position, also with portions of the mounting bracket omitted for clarity.

DESCRIPTION OF THE PREFERRED EMBODIMENTS

Illustrated in FIG. 1 is a partially broken away fragmentary view of a chain saw, generally indicated by numeral 10. The chain saw 10 typically comprises a motor or engine shroud 12, a handle 14, and a chain support bar 16. The bar 16 serves as a guide for a cutting chain 18 having cutters 19. The chain 18 is a top-sharpening type which is well known in the art. An example can be found in U.S. Pat. No. 3,138,973, Chain Saw With Sharpening Means by Muir. The chain 18 is driven by a sprocket 20 which in turn is driven in a conventional fashion by a chain saw power means (not shown) disposed within the shroud 12. A cutting chain sharpening device or assembly 22 is mounted in an opening 24 provided in the shroud 12 and is supported in a fixed position by bracket 26 which is rigidly secured by screws 27 and 27' to interior portions of the shroud 12.

Illustrated in FIG. 7 is a top view of the bracket 26 while illustrated in FIG. 8 is a side elevation view of the bracket. Referring to FIGS. 7 and 8 it can be seen that the bracket 26 has a sharpening device mounting flange 30 having an aperture 32 therethrough. Also provided on the flange 30 are two threaded fastener holes 34. The leg 36 of the bracket 26 contains an oversize fastener hole 38 and at one end a generally "U" shaped notch 40. The use of the notch 40 and fastener hole 38 allows for adjustment of the bracket so that the sharpener can be properly positioned.

Figure 3:
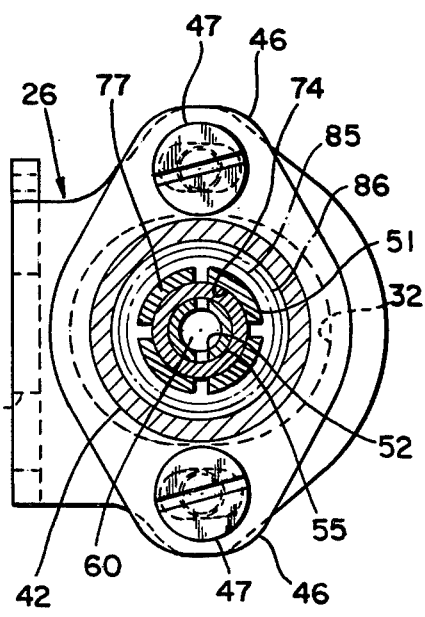

Now Referring to FIGS. 2 and 3, it can be seen that the sharpener assembly 22 comprises a hollow sharpener housing 42, which acts as a positioning means, having an open first end 43 and a second end 44 partially closed by a housing flange 45. The housing 42 further incorporates an external flange 46 adapted to mate with the flange 30 of the bracket 26 with the housing extending through the aperture 32. The housing 42 is retained in this position by fasteners 47 which extend through holes 48 in the external flange 46 and threadedly engage holes 34 in the flange 30.

Still referring to FIGS. 2 and 3, grinding means for grinding said cutters, generally designated by numeral 50, is provided which comprises a hollow first shaft 51 having an aperture 52 therethrough, movably mounted at a first end 53 in aperture 54 of the housing flange 45. A second end 55 of the first shaft 51 terminates in a pair of flexible members 56 having chamfered internally facing lugs 57 mounted thereto.

Rotatably mounted within the aperture 52 of the shaft 51 is a second shaft 60 which at its first end 61 has a groove 62 which is engaged by the lugs 57 of the flexible members 56. Thus, second shaft 60 is locked to the first shaft 51. A second end 63 of the second shaft 60 extends out of the first end 53 of the shaft 51 and is joined to a grinding stone 65, preferably by bonding the end 63 into a hole 66 in the grinding stone. The grinding stone has a washer 67 bonded thereto for support purposes. The washer 67 is larger in diameter than the aperture 54 so that the housing flange 45 becomes a stop defining a first position (spaced away from the cutters 19, as shown in FIG. 1) for the grinding means 50.

Actuator means, generally designated by numeral 70, is movably mounted in the first open end 43 of housing 42. The actuator means 70 comprises a cup-shaped knob 71 having an actuator shaft 72 mounted in the center forming an annular channel 73, having a U-shaped cross-section. The actuator shaft 72 has a bore 74 which slideably engages shaft 51. Mounted in the channel 73 and affixed to the shaft 72 is a sleeve 75 having an internal bore 76. The sleeve 75 terminates in flexible members 77 having internally facing chamfered lugs 79.

The first shaft 51 also incorporates a second flange 82. A first biasing means for yieldably urging the grinding means toward its second position and the actuator means toward its retracted position, typically in the form of a first compression spring 85, is mounted within the housing 42 and is positioned between the sleeve 75 and the flange 82. A second biasing means for yieldably urging the actuator means towards its second position, in the form of a second compression spring 86, is also mounted within the housing 42. By so mounting the springs 85 and 86 within the housing 42, debris is prevented from jamming the springs 85, 86 between sleeve 75 and the housing flange 45. Springs 85, 86 may be arranged in coaxial relationship relative to each other.

Assembly of the sharpening device 22 is accomplished by first inserting the first shaft 51 into housing 42. Thereafter the second shaft 60 (with the grinding stone 65 attached thereto) is inserted into the aperture 52 of the first shaft 51 so that the necked down portion 62 is aligned with the lugs 57 locking the second shaft 60 in place (the flexible members 56 are spread apart when the second shaft 60 contacts the lugs 57). The next step is to install the springs 85 and 86 into the housing 42. The actuator means 70 is then pushed down over the grinding means 50 so that the lugs 79 pass over the first flange 80 (the flexible members 77 are spread apart when the lugs 79 contact the first flange 80).

In operation, when the sharpening device 22 is properly mounted to the chain saw 10, and with the chain moving, the operator need only apply force to cause the knob 71 to move to the actuated position as shown in FIG. 9. This causes the lugs 79 to move toward the cutters 19, which will cause the first spring 85 to force the grinding stone 65 to move from its first position spaced from the cutters 19 (FIG. 2), to a second position in contact with the cutters 19 as they pass by, grinding a sharp edge on each one (FIG. 9). Preferably, axis 88 of the grinding stone 65 is offset from the center line 90 of the cutting chain 18. (Again see FIG. 9.) This arrangement permits the grinding stone 65 to rotate under the influence of the force generated by the cutters 19 thereby preventing asymmetrical wear of the grinding stone. Release of the knob 71 will allow second spring 86 to push the knob 71 back to its retracted position, and with the lugs 79 of the sleeve 75 coming into engagement with the first flange 80 on the first shaft 51, the grinding means 50 is retracted to its first position spaced from the cutters 19. Thus the lugs 79, sleeve 75, and first flange 80 cooperate to form a coupling means for coupling the grinding means to the actuator means so that the grinding means is moved to its first position responsive to the actuator means being moved to its retracted position.

The grinding stone 65 has an effective useful length, generally indicated by numeral 99, after which it will not effectively sharpen the cutters (FIGS. 2 and 9). Use of the grinding stone 65 beyond its useful length can be prevented by selecting the distance from the first end 43 of the housing 42 and the surface 73' of the channel 73 of knob 71 to be a length that will prevent this point from being reached. Again, this is best illustrated in FIGS. 2 and 9. It should be noted that the stone of FIG. 9 is shown as having attained its minimum useful length.

One of the main advantages of the sharpening device 22 is that once installed no further adjustment need be made such as is required by the sharpener disclosed in U.S. Pat. No. 4,062,253, Chain Saw Sharpener by J. L. Dilworth. After the stone wears, and when the operator pushes the knob 71 to a point where it eventually must contact first end 43 of the housing 42, there will result only a slight decrease in the force applied to the cutting edges. Thus there is no need for a detent system.

Illustrated in FIGS. 4, 5 and 6 is a second embodiment of the sharpener assembly of the present invention, generally designated by numeral 100. It can be seen that the sharpener assembly 100 comprises a hollow sharpener housing 102 having an open first end 103. A second end 104 is partially closed off by an internal flange 105 located a small distance from end 104 and forming a recess 106. The housing 102 further incorporates an external flange 107 having fastener holes 108 and which is adapted to mate with the flange 30 of the bracket 26 (illustrated in FIGS. 7 and 8). The housing 102 is mounted to the chain saw by the method used for the sharpener assembly 22 as illustrated in FIGS. 1 and 2.

Installed within the housing 102 is a bushing 110. The bushing 110 has a flange 112 in contact with internal flange 105 of the housing 102. The bushing 110 also has a bushing end 114 extending through an aperture 116 in the internal flange 105. The bushing end 114 is generally annular in cross-section, but having opposed flats 118 and 119. (Shown in FIG. 6.) The aperture 116 of internal flange 105 has a complementary shape; thus, the bushing 110 is prevented from rotating relative to the housing 102. The bushing 110 further defines an internal bore 124 and a centrally-located aperture 126 in communication with the bore 124. It should be noted that the housing 102 and bushing 110 are separate pieces; however, they could be fabricated as a single element.

A sleeve 128 having an upper flange 132 is slideably mounted in centrally-located aperture 126. Slideably and rotatably mounted through the sleeve 128 is a shaft 136 having a first end 138 extending out of the housing 102. A grinding stone 139 is joined to the first end 138 of the shaft 136 by bonding the end into a hole 142 in the grinding stone. A washer 143 is bonded to the grinding stone 139 for support purposes.

As will be understood by those skilled in the art, if dirt or debris were to become lodged between the bushing end 114 and the washer 143, free rotation of the grinding stone 139 would be impaired, due to the influence of the forces transmitted by the moving cutters 19. This can be prevented by providing the washer 143 with a peripheral flange 144 which engages the flange 105 around its circumference. It should be noted that this arrangement could be applied to the sharpening device 22 illustrated in FIGS. 1 and 2.

Threaded actuator means 145 comprises a knob 146 which engages a threaded sleeve 148. The threaded sleeve 148 has a bore 150 and is adapted to slideably engage the bore 124 of the bushing 110. The threaded sleeve 148 has an internal sleeve flange 152 within the bore 150. The second end 151 of the shaft 136 extends through an aperture 154 in the sleeve flange 152 and is slideable and rotatable therein. The shaft 136 is prevented from withdrawl from the aperture 154 by means of a snap ring 160 mounted in groove 162 on the shaft 136.

First biasing means, in the form of compression spring 164, is mounted between upper flange 132 of the sleeve 128 and flange 152 of the threaded sleeve 148. Second biasing means, in the form of a compression spring 166, is mounted between the knob 146 and the bushing flange 112.

In order to prevent rotation of the actuator means 145 relative to the bushing 110 the bushing 110 incorporates a slot 170 (see FIG. 5) which is engaged by a protrusion 172 on the threaded sleeve 148. This prevents rotation but allows axial movement of the threaded sleeve 148 relative to bushing 110.

The sharpener assembly 100 generally operates in a fashion similar to sharpener assembly 22; i.e., responsive to pressure on the knob 146, the flange 152 is moved from its first position (FIG. 4) toward the cutter 19, which allows spring 164 to force the grinding stone 139 in its second position into contact with the cutter. (FIG. 10) Upon release of the knob 146, spring 166 retracts the stone to its original position.

As with the previous embodiment and as shown in FIG. 4, the grinding stone 139 has a specific useful length designated by numeral 180 after which effective sharpening of the cutters 19 cannot be satisfactorily accomplished. A limit upon the movement of the grinding stone 139 is attained by controlling the distance between surface 182 of the knob 146 and the end 103 of the sharpener housing 102.

To assemble the sharpening device 100 the bushing 110 is installed in the housing 102. The sleeve 128 is installed in the bushing 110. The shaft 136 with grinding stone 139 and washer 143 is inserted into the sleeve 128. Next the spring 164 and threaded sleeve 148 are installed and locked in place by snap ring 162. Spring 166 is next installed, and finally threaded knob 146 is screwed into the threaded sleeve 148. It should be noted that the threaded sleeve 148 is prevented from rotating by protrusion 172 in groove 170.

While the sharpening device has been described with reference to particular embodiments, it should be understood that the embodiments are merely illustrative as there are numerous variations and modifications which may be made by those skilled in the art. Thus the invention is to be construed as being limited only by the spirit and scope of the appended claims.

What is claimed is:

1. In a chain saw of the type having an endless saw chain driven by power means supported by a chain saw housing, and a sharpening device to sharpen the cutters on said saw chain when said saw chain is in motion, said sharpening device comprising:
   a. positioning means for connecting said chain sharpening device to said chain saw housing;
   b. grinding means, movably connected to said positioning means, for grinding said cutters, said grinding means being movable from a first position spaced from said cutters to a second position engaging said cutters, and vice-versa;
   c. actuator means, movably connected to said positioning means and responsive to an applied force, for causing said grinding means to engage said cutters, said actuator means being movable from a retracted position to an actuated position, and vice-versa;
   d. first biasing means, operatively connected to said actuator means and said grinding means, for yieldably urging said grinding means toward said second position and said actuator means toward said retracted position; and
   e. second biasing means, operatively connected to said actuator means and said positioning means, for yieldably urging said actuator means toward said retracted position.

2. The chain saw of claim 1, further comprising coupling means for coupling said grinding means to said actuator means so that said grinding means is moved to said first position responsive to said actuator means being moved to said retracted position.

3. The chain saw of claim 2, wherein:
   a. said first biasing means moving said grinding means to said second position responsive to movement by said actuator means to said actuated position; and
   b. said second biasing means moving said actuator means to said retracted position responsive to release of said actuator means.

4. The chain saw of claim 3, wherein said positioning means including a hollow sharpener housing having an open first end and a second end, said second end defining said first position of said grinding means.

5. The chain saw of claim 4, wherein:
   a. said actuator means being mounted adjacent said first end;
   b. said first biasing means being located in said sharpener housing between said actuator means and said grinding means; and
   c. said second biasing means being located in said sharpener housing between said actuator means and said second end.

6. The combination claimed in claim 5, wherein:
   a. said first and second biasing means being in coaxial relationship relative to each other; and
   b. said coupling means being located within said sharpener housing and interior of said first and second biasing means.

7. In a chain saw of the type having an endless saw chain driven by power means supported by a chain saw housing, and a sharpening device to sharpen the cutters on said saw chain when said saw chain is in motion, said sharpening device comprising:
   a. a hollow sharpener housing connected to said chain saw housing and having an open first end and a partially closed second end defining an aperture;
   b. grinding means movably connected to said sharpening housing for grinding said cutters, said grinding means including a grinding stone and being movable from a first position defined by said second end and spaced from said cutters, to a second position engaging said cutters, and vice-versa;
   c. actuator means movably connected to said sharpener housing and responsive to an applied force, for causing said grinding means to engage said cutters, said actuator means being movable from a retracted position to an actuated position;
   d. first biasing means, operatively connected to said actuator means and said grinding means, for yieldably urging said grinding means toward said second position and said actuator means toward said retracted position; and
   e. second biasing means, operatively connected to said actuator means and said sharpener housing, for yieldably urging said actuator means toward said retracted position.

8. The chain saw of claim 7 wherein:
   a. said sharpener housing having a bushing mounted therein, said bushing having an internal bore;
   b. said grinding means including a shaft attached to said grinding stone, said shaft of said grinding means being slideably mounted in said aperture of said second end of said sharpener housing; and
   c. said actuator means including a knob having a hollow shaft mounted thereto, said hollow shaft of said actuator means being slideably mounted within said bore of said bushing.

9. The chain saw of claim 8, wherein:
   a. said actuator means further having an aperture therethrough;
   b. said shaft of said grinding means also being mounted through said aperture of said actuator means and further comprising;
   c. locking means for preventing said shaft of said grinding means from withdrawing from said aperture of said actuator means.

10. The chain saw of claim 7, wherein:
    a. said grinding stone having a specific useful length;
    b. said sharpener housing having a member defining said actuated position of said actuator means; and
    c. said actuator means being operatively associated with said sharpener housing member so that said grinding stone cannot engage said cutting edges at a point beyond said specific useful length when said actuator means is in said actuated position.

11. The chain saw of claim 10, wherein said member of said sharpener housing being said second end of said sharpener housing.

12. The chain saw of claim 8, further comprising:
    a. a sleeve movably mounted on said shaft of said grinding means and extending through and being movable in said aperture of said closed end of said sharpener housing, said sleeve further having a flange mounted thereto between said closed end of said housing and said actuator means; and
    b. said first biasing means including a spring mounted within said sharpener housing between said flange of said sleeve and said actuator means.

13. The chain saw of claim 12, wherein:
    a. said grinding stone having a washer joined thereto, said washer having a peripheral flange engageable with said closed end of said sharpener housing, thereby sealing off the interior of said sharpener housing when said grinding means is in said first position.

14. The chain saw of claim 12, further comprising means for preventing said actuator means from rotating in said bushing.

15. The chain saw of claim 12, wherein:
   a. said shaft of said grinding means having a flange mounted thereto; and
   b. said first biasing means including a spring mounted between said actuator means and said flange of said shaft of said grinding means;

16. In a chain saw of the type having an endless saw chain driven by power means supported by a chain saw housing, and a sharpening device to sharpen the cutters on said saw chain when said saw chain is in motion, said sharpening device comprising:
   a. a hollow sharpener housing having an open first end and a closed second end;
   b. grinding means movably connected to said sharpener housing for grinding said cutters, said grinding means includes a grinding stone and being moveable from a first position spaced from said cutters to a second position engaging said cutters, and vice-versa;
   c. said closed end of said sharpener housing having an aperture therethrough;
   d. said grinding means having a shaft attached to said grinding stone, said shaft of said grinding stone slideably mounted in said aperture of said closed end;
   e. actuator means movably connected to said positioning means and responsive to an applied force, for causing said grinding means to engage said cutters, said actuator means being movable from a retracted position to an actuated position, and vice-versa;
   f. said actuator means including a knob having a hollow shaft both of which being slideably mounted in said open end of said sharpener housing;
   g. first biasing means, operatively connected to said actuator means and said grinding means, for yieldably urging said grinding means toward said second position and said actuator means toward said retracted position; and
   h. second biasing means, operatively connected to said actuator means and said positioning means, for yieldably urging said actuator means toward said retracted position.

17. The chain saw of claim 16, wherein:
   a. said hollow shaft of said actuator means terminating in a plurality of flexible members having inward facing lugs; and
   b. said shaft of said grinding means having a flange mounted within said hollow shaft, said lugs of said hollow shaft preventing said flange of said shaft of said actuator means from withdrawing from said hollow shaft.

18. The chain saw of claim 17, wherein:
   a. said grinding stone having a specific useful length;
   b. said sharpener housing having a member at said first end defining said actuated position of said actuator means; and
   c. said actuator means being engageable with said housing member so that said grinding stone cannot engage said cutting edges at a point beyond said specific useful length.

19. The chain saw of claim 17, wherein:
   a. said hollow shaft having a flange mounted thereto, and said first biasing means being a compression spring mounted between said actuator means and said flange.

20. The chain saw of claim 19, wherein said second biasing means being a compression spring mounted within said housing between said actuator means and said closed end of said housing.

* * * * *